United States Patent
Bellili et al.

(10) Patent No.: US 11,405,240 B2
(45) Date of Patent: Aug. 2, 2022

(54) METHOD FOR MASSIVE UNSOURCED RANDOM ACCESS

(71) Applicant: UNIVERSITY OF MANITOBA, Winnipeg (CA)

(72) Inventors: Faouzi Bellili, Winnipeg (CA); Amine Mezghani, Winnipeg (CA); Volodymyr Shyianov, Winnipeg (CA); Ekram Hossain, Winnipeg (CA)

(73) Assignee: UNIVERSITY OF MANITOBA, Winnipeg (CA)

( * ) Notice: Subject to any disclaimer, the term of this patent is extended or adjusted under 35 U.S.C. 154(b) by 0 days.

(21) Appl. No.: 17/399,681

(22) Filed: Aug. 11, 2021

(65) Prior Publication Data

US 2022/0052883 A1 Feb. 17, 2022

Related U.S. Application Data

(60) Provisional application No. 63/064,080, filed on Aug. 11, 2020.

(51) Int. Cl.
*H04L 25/02* (2006.01)
*H04B 7/04* (2017.01)
*H04W 74/08* (2009.01)

(52) U.S. Cl.
CPC ........... *H04L 25/0242* (2013.01); *H04B 7/04* (2013.01); *H04W 74/0833* (2013.01)

(58) Field of Classification Search
CPC . H04L 25/0242; H04L 25/03292; H04B 7/04; H04W 74/0833
See application file for complete search history.

(56) References Cited

U.S. PATENT DOCUMENTS

| | | | | |
|---|---|---|---|---|
| 8,139,593 | B2 * | 3/2012 | Dravida | ................ H04L 49/901 |
| | | | | 709/249 |
| 2017/0054526 | A1 * | 2/2017 | Saavedra | .............. H04L 1/0034 |
| 2019/0342225 | A1 * | 11/2019 | Sanghi | .................... H04L 45/30 |

* cited by examiner

*Primary Examiner* — Sung S Ahn
(74) *Attorney, Agent, or Firm* — Christopher J. Dynowski; Ryan W. Dupuis; Ade & Company Inc.

(57) ABSTRACT

A method for receiving, at a communications station which has a plurality of antennas, messages from a plurality of users in wireless communication with the communications station, comprising the steps of: (i) receiving, from the users, using the plurality of antennas, time-slotted information chunks formed from the messages of the users, wherein the information chunks are free of any encoded user-identifiers representative of the users transmitting the messages; (ii) after receiving all of the information chunks, estimating vectors representative of respective communication channels between the antennas and the users based on the received information chunks; (iii) grouping the information chunks based on the estimated vectors to form clusters of the information chunks respectively associated with the users; and (iv) recovering the messages of the users from the clusters of the information chunks.

8 Claims, 6 Drawing Sheets

Algorithm 1 Sum-Product HyGAMP

Require: $A \in \mathbb{R}^{M \times N}$; $y \in \mathbb{R}^M$; $\sigma_x$, $\lambda$, $\sigma_w^2$, precision tolerance ($\xi$), maximum number of iterations ($T_{MAX}$)

Ensure: MMSE estimates, $\{\hat{x}_{q,j}\}_{q=1}^{2M}$, of $\{x_{q,j}\}_{q=1}^{2M}$ $\forall j$, and MAP estimates, $\{\hat{c}_j\}_{j=1}^{2^J}$, of $\{c_j\}_{j=1}^{2^J}$ 1: Initialization
2: $t \leftarrow 0$
3: $\forall q, j : \mu_{q,j}^x(t-1) = 1$
4: $\forall q, j : \hat{x}_{q,j}(t-1) = 0$
5: $\forall q, j : LLR_{q \leftarrow j}(t-1) = \log(\lambda/(1-\lambda))$
6: $\forall q, j : \hat{\rho}_{q,j}(t) = 1/[1 + \exp(-LLR_{q \leftarrow j}(t-1))]$
7: repeat
8: $\quad \forall q, j : \hat{x}_{q,j}(t) = \mathbb{E}_{x_{q,j}|y}\{x_{q,j}|y; \hat{r}_{q,j}(t-1), \mu_{q,j}^r(t-1), \hat{\rho}_{q,j}(t), \sigma_x\}$
9: $\quad \forall q, j : \mu_{q,j}^x(t) = \text{var}_{x_{q,j}|y}\{x_{q,j}|y; \hat{r}_{q,j}(t-1), \mu_{q,j}^r(t-1), \hat{\rho}_{q,j}(t), \sigma_x\}$
10: $\quad \forall i : \hat{z}_i(t) = \sum_{q,j} A_{iq}^{(j)} \hat{x}_{q,j}(t)$
11: $\quad \forall i : \mu_i^p(t) = \sum_{q,j} |A_{iq}^{(j)}|^2 \mu_{q,j}^x(t)$
12: $\quad \forall i : \hat{p}_i(t) = \hat{z}_i(t) - \mu_i^p(t)\hat{s}_i(t-1)$
13: $\quad \forall i : \hat{z}_i^0(t) = \mathbb{E}_{z_i|y}\{z_i|y; \hat{p}_i(t), \mu_i^p(t), \sigma_w^2\}$
14: $\quad \forall i : \mu_i^z(t) = \text{var}_{z_i|y}\{z_i|y; \hat{p}_i(t), \mu_i^p(t), \sigma_w^2\}$
15: $\quad \forall i : \hat{s}_i(t) = \frac{1}{\mu_i^p(t)}[\hat{z}_i^0(t) - \hat{p}_i(t)]$
16: $\quad \forall i : \mu_i^s(t) = \frac{1}{\mu_i^p(t)}\left[1 - \frac{\mu_i^z(t)}{\mu_i^p(t)}\right]$
17: $\quad \forall q, j : \mu_{q,j}^r(t) = \left(\sum_i |A_{iq}^{(j)}|^2 \mu_i^s(t)\right)^{-1}$
18: $\quad \forall q, j : \hat{r}_{q,j}(t) = \hat{x}_{q,j}(t) + \mu_{q,j}^r(t) \sum_i A_{iq}^{(j)} \hat{s}_i(t)$
19: $\quad \forall q, j : $ Compute $LLR_{q \rightarrow j}(t)$ using (38)
20: $\quad \forall q, j : LLR_{q \leftarrow j}(t) = \log(\lambda/(1-\lambda)) + \sum_{q' \neq q} LLR_{q' \rightarrow j}(t)$
21: $\quad \forall q, j : \hat{\rho}_{q,j}(t+1) = 1/[1 + \exp(-LLR_{q \leftarrow j}(t))]$
22: $\quad t \leftarrow t + 1$
23: until $\|\hat{x}(t+1) - \hat{x}(t)\|^2 \leq \xi \|\hat{x}(t)\|^2$ or $t > T_{MAX}$

METHOD FOR MASSIVE UNSOURCED RANDOM ACCESS

This application claims the benefit under 35 U.S.C. 119(e) of U.S. provisional application Ser. No. 63/064,080 filed Aug. 11, 2020, which is incorporated by reference herein.

FIELD OF THE INVENTION

The present invention relates generally to massive unsourced random access, and more particularly to that based on uncoupled compressive sensing.

BACKGROUND

Massive random access in which a base station (BS) equipped with a large number of antennas is serving a large number of contending users has recently attracted considerable attention. This surge of interest is fueled by the demand in wireless connectivity for many envisioned Internet of Things (loT) applications such as massive machine-type communication (mMTC). MTC has two distinct features [1] that make them drastically different from human-type communications (HTC) around which previous cellular systems have mainly evolved: i) machine-type devices (MTDs) require sporadic access to the network and ii) MTDs usually transmit small data payloads using short-packet signaling. The sporadic access leads to the overall mMTC traffic being generated by an unknown and random subset of active MTDs (at any given transmission instant or frame). This calls for the development of scalable random access protocols that are able to accommodate a massive number of MTDs. Short-packet transmissions, however, make the traditional grant-based access (with the associated scheduling overhead) fall short in terms of spectrum efficiency and latency, which are two key performance metrics in next-generation wireless networks. Hence, a number of grant-free random access schemes have been recently investigated within the specific context of massive connectivity (see [2] and references therein). In sourced1 random access, grant-free transmissions often require two phases: i) pilot sequences are first used to detect the active users and estimate their channels, then ii) the identified active users are scheduled to transmit their messages.

In this context, it was shown that the joint device activity detection and channel estimation task can be cast as a compressed sensing (CS) problem; more precisely a useful CS variant called the multiple-measurement vector (MMV) in presence of multiple receive antennas. Among a plethora of CS recovery techniques, the approximate message passing (AMP) algorithm [3] has attracted considerable attention within the framework of massive random access mainly due to the existence of simple scalar equations that track its dynamics, as rigorously analyzed in [4].

Besides CS-based schemes, there is another line of work that has investigated the use of random access strategies based on conventional ALOHA [5] and coded slotted ALOHA [6]. In many applications, however, the BS is interested in the transmitted messages only and not the identities (IDs) of the users, thereby leading to the so-called unsourced random access (URA). The information-theoretic work in [7] introduced a random coding existence bound for URA using a random Gaussian codebook with maximum likelihood-decoding at the BS. Moreover, popular multiple access schemes, e.g., ALOHA, coded slotted ALOHA, and treating interference as noise (TIN) were compared against the established fundamental limit, showing that none of them achieves the optimal predicted performance. The difficulty in achieving the underlying bound stems from the exponential (in blocklength) size of the codebooks analyzed in [7].

Recent works on URA have focused more on the algorithmic aspect of the problem by relying on the CS-based encoding/decoding paradigm in conjunction with a slotted transmission framework. The use of slotted transmissions may alleviate the inherent prohibitive computational burden of the underlying index coding problem. More specifically, in the coded/coupled compressive sensing (CCS) scheme [8], the binary message of each user is partitioned into multiple information bit sequences (or chunks). Then binary linear block coding is used to couple the different sequences before using a random Gaussian codebook for actual transmissions over multiple slots. At the receiver side, inner CS-based decoding is first performed to recover the slot-wise transmitted sequences up to an unknown permutation. An outer tree-based decoder is then used to stitch the decoded binary sequences across different slots. A computationally tractable URA scheme has been recently proposed in [9]—based on the CCS framework—wherein the authors exploit the concept of sparse regression codes (SPARCs) [10] to reduce the size of the required codebook matrix. The main idea of SPARCs is to encode information in structured linear combinations of the columns of a fixed codebook matrix so as to design a polynomial-time complexity encoder over the field of real numbers. In [9], the AMP algorithm was used as inner CS decoder and the state-evolution framework was utilized to analyze the performance of the resulting URA scheme. Further extensions of the CSS framework for URA were also made in [11] where a low-complexity algorithm based on chirps for CS decoding was introduced. A number of other algorithmic solutions to the unsourced random access problem were also reported in [12][14]. However, all the aforementioned works assume a single receive antenna at the BS and it was only recently that the use of large-scale antenna arrays in the context of URA has been investigated in [15]. There, the authors use a low-complexity covariance-based CS (CB-CS) recovery algorithm [16] for activity detection, which iteratively finds the large-scale fading coefficients of all the users. Within the specific context of massive connectivity, CB-CS has the best known scaling law in terms of the required number of observations versus the number of active users. Above the CS regime [17], i.e., more active users than observations, CB-CS algorithm generally requires a much smaller number of antennas than AMP-MMV to achieve the same level of performance. In the context of massive URA this particular regime of operation is most desirable since an increase in the number of active users at a fixed number of observations leads to higher spectral efficiency. In sourced random access, existing CS-based algorithms that reconstruct the entire channel matrix require large-size pilot sequences (i.e., a prohibitively large overhead) in presence of a large number of active users. To sidestep this problem, CB-SC relies rather on the use of receive antennas to identify the more active users by estimating their large-scale coefficients only. In the URA scenario, however, no user identification is required and the entire transmission frame is dedicated to data communication.

SUMMARY OF THE DISCLOSURE

There is disclosed an algorithmic solution to the URA problem that can accommodate many more active users than the number of receive antenna elements at the BS. Assuming the channels remain almost unchanged over the entire transmission period, the proposed scheme exploits the spatial channel statistics to stitch the decoded binary sequences among different slots thereby eliminating concatenated coding, which is found in existing works on CCS-based URA such as [8], [11], [15]. In fact, the strong correlation between the slot-wise reconstructed channel vectors pertaining to each active device already provides sufficient information for stitching its decoded sequences across the different slots. It is the task of the inner CS-based decoder to recover the support of the unknown sparse vector and to estimate the users' channels in each slot. Each recovered support is used to decode the associated information bit sequences that were transmitted by all the active users. Then, by clustering together the slot-wise reconstructed channels of each user, it will be possible to cluster/stitch its decoded sequences in order to recover its entire packet.

The novel CS-based decoder is based on a recent CS technique called the HyGAMP algorithm, which is able to account for the group sparsity in the underlying MMV model by incorporating latent Bernoulli random variables. HyGAMP runs loopy belief propagation coupled with Gaussian and quadratic approximations, for the propagated messages, which become increasingly accurate in the large system limits i.e., large codebook sizes). At convergence, HyGAMP provides MMSE and MAP estimates of the users' channels and their activity-indicator Bernoulli random variables. It should be noted that HyGAMP is one of the varieties of CS algorithms that can be used in conjunction with clustering-based stitching. For instance, AMP-MMV [18], CoSaMP [19], Group Lasso [20] or even any support recovery algorithm followed by least-squares channel estimation (e.g., [15], [17]) can all be envisaged. While the performance would vary depending on the particular choice of CS algorithm, those and other alternatives were not further explored in this disclosure.

Furthermore, the Gaussian-mixture expectation-maximization principle is utilized for channel clustering in combination with an integer optimization framework to embed two clustering constraints that are very specific to our problem. It will be seen that the newly proposed algorithm outperforms the state-of-the-art related techniques. In particular, our algorithm makes it possible to accommodate a larger total spectral efficiency with reasonable antenna array sizes while bringing in performance advantages in terms of the decoding error probability.

BRIEF DESCRIPTION OF THE DRAWINGS

The invention will now be described in conjunction with the accompanying drawings in which:

FIG. 1C shows an algorithm

In the drawings like characters of reference indicate corresponding parts in the different figures.

DETAILED DESCRIPTION

With reference to the accompanying figures, there is described a system model of the novel algorithmic solution, the HyGAMP-based inner CS encoder/decoder, and the clustering-based stitching procedure of the decoded sequences. Performance of the proposed URA scheme is assessed using exhaustive computer simulations.

Common notations include: lower- and upper-case bold fonts, x and X, are used to denote vectors and matrices, respectively. Upper-case calligraphic font, $\mathcal{X}$ and X, is used to denote single and multivariate random variables, respectively, as well as for sets notation (depending on the context). The (m,n)th entry of X is denoted as $X_{mn}$, and the nth element of x is denoted as $x_n$. The identity matrix is denoted as I. The operator vec(X) stacks the columns of a matrix X one below the other. The shorthand notation $\chi \sim \mathcal{CN}(x; m, R)$ means that the random vector follows a complex circular Gaussian distribution with mean m and auto-covariance matrix R. Likewise, $\chi \sim \mathcal{N}(x; m, \mu)$ means that the random variable $\chi$ follows a Gaussian distribution with mean m and variance $\mu$. Moreover, $\{\bullet\}^T$ and $\{\bullet\}^H$ stand for the transpose and Hermitian (transpose conjugate) operators, respectively. In addition, $|\bullet|$ and $\|\bullet\|$ stand for the modulus and Euclidean norm, respectively. Given any complex number, $\Re\{\bullet\}$, $\Im\{\bullet\}$, and $\{\bullet\}^*$ return its real part, imaginary part, and complex conjugate, respectively. The Kronecker function and product are denoted as $\delta_{m,n}$ and ß, respectively. We also denote the probability distribution function (pdf) of single and multivariate random variables (RVs) by $p_x(x)$ and $p_x(x)$, respectively. The statistical expectation is denoted as $\mathbb{E}\{\bullet\}$, j is the imaginary unit (i.e., $j^2=-1$), and the notation $\triangleq$ is used for definitions.

System Model and Assumptions

Consider a single-cell network consisting of K single-antenna devices which are being served by a base station located at the center of a cell of radius R. Devices are assumed to be uniformly scattered inside the cell, and we denote by $r_k$ (measured in meters) the distance from the kth device to the base station. This disclosure assumes sporadic device activity thereby resulting in a small number, $K_a \ll K$, of devices being active over each coherence block. The devices communicate to the base station through the uplink uncoordinated scheme, in which every active device wishes to communicate B bits of information over the channel in a single communication round. The codewords transmitted by active devices are drawn uniformly from a common Gaussian codebook $\mathcal{C}=\{\tilde{c}_1, \tilde{c}_2, \ldots, \tilde{c}_{2^B}\} \subset \mathbb{C}^n$. More precisely, $\tilde{c}_b \sim \mathcal{CN}(0, P_t I)$ where n is the blocklength and $P_t$ is the transmit power. We model the device activity and codeword selection by a set of $2^B K$ Bernoulli random variables $\delta_{b,k}$ for $k=1, \ldots, K$ and $b=1, \ldots, 2^B$ $$\delta_{b,k} = \begin{cases} 1 & \text{if user } k \text{ is active and transmits codeword } \tilde{c}_b, \\ 0 & \text{otherwise} \end{cases}$$

We consider a Gaussian multiple access channel (MAC) with a block fading model and a large-scale antenna array consisting of $M_r$ receive antenna elements at the BS. Assuming the channels remain almost unchanged over the entire transmission period, the uplink received signal at the mth antenna element can be expressed as follows:

$$\tilde{y}^{(m)} = \sum_{k=1}^{K} \sum_{b=1}^{2^B} \sqrt{g_k} \tilde{h}_{k,m} \delta_{b,k} \tilde{c}_b + \tilde{w}^{(m)}, m=1, \ldots, M_r. \quad (1)$$

The random noise vector, $\tilde{w}^{(m)}$, is modeled by a complex circular Gaussian random vector with independent and identically distributed (i.i.d.) components, i.e., $\tilde{w}^{(m)} \sim \mathcal{CN}(0, \sigma_w^2 I)$. In addition, $\tilde{h}_{k,m}$ stands for the small-scale fading coefficient between the kth user and the mth antenna. We assume Rayleigh block fading, i.e., the small-scale fading channel coefficients, $\tilde{h}_{k,m} \sim \mathcal{CN}(0,1)$, remain constant over the entire observation window which is smaller than the coherence time. Besides, $g_k$ is the large-scale fading coefficient of user k given by (in dB scale):

$$g_k[\text{dB}] = -\alpha - 10\beta \log_{10}(r_k), \quad (2)$$

where $\alpha$ is the fading coefficient measured at distance d=5 meter and $\beta$ is the pathloss exponent. For convenience, we also define the effective channel coefficient by lumping the large- and small-scale fading coefficients together in one quantity, denoted as $h_{k,m} \triangleq \sqrt{g_k} \tilde{h}_{k,m}$, thereby yielding the following equivalent model:

$$\tilde{y}^{(m)} = \sum_{k=1}^{K} \sum_{b=1}^{2^B} h_{k,m} \delta_{b,k} \tilde{c}_b + \tilde{w}^{(m)}, m=1, \ldots, M_r. \quad (3)$$

To define the random access code for this channel, let $W_k \in [2^B] \triangleq \{1, 2, \ldots, 2^B\}$ denote the message of user k, such that for some encoding function $f: [2^B] \to \mathbb{C}^n$, we have $f(W_k) = \tilde{c}_{b_k}$. By recalling that $K_a$ stands for the number of active users, the decoding[1] map g:

$$\mathbb{C}^{n \times M_r} \to \binom{[2^B]}{K_a}$$

outputs a list of $K_a$ decoded messages with the probability of error being defined as:

$$P_e = \frac{1}{K_a} \sum_{k=1}^{K_a} Pr(E_k), \quad (4)$$

and $E_k \triangleq \{W_k \notin g(\tilde{y}^{(1)}, \tilde{y}^{(2)}, \ldots, \tilde{y}^{(M_r)})\}$. Notice here that $P_e$ depends solely on the number of active users, $K_a$, instead of the total number of users K. With this formulation in mind, we rewrite (3) in a more succinct matrix-vector form as follows:

$$\tilde{y}^{(m)} = \tilde{C} \tilde{\Delta} h^{(m)} + \tilde{w}^{(m)}, m=1, \ldots, M_r, \quad (5)$$

in which $\tilde{C} = [\tilde{c}_1, \tilde{c}_2, \ldots, \tilde{c}_{2^B}] \in \mathbb{C}^{n \times 2^B}$ is the codebook matrix, which is common to all the users and $h^{(m)} = [h_{1,m}, h_{2,m}, \ldots, h_{K,m}]^T \in \mathbb{C}^K$ is the multi-user channel vector at the mth antenna which incorporates the small- and large-scale fading coefficients. The matrix $\tilde{\Delta} \in \{0,1\}^{2^B \times K}$ contains only $K_a$ non-zero columns each of which having a single non-zero entry. Observe here that both $\tilde{\Delta}$ and $h^{(m)}$ are unknown to the receiver. Hence, by defining $\tilde{x}^{(m)} \triangleq \tilde{\Delta} h^{(m)}$, it follows that:

$$\tilde{y}^{(m)} = \tilde{C} \tilde{x}^{(m)} + \tilde{w}^{(m)}, m=1, \ldots, M_r. \quad (6)$$

[1] The notation $$\binom{[2^B]}{K_a}$$

standing for choosing $K_a$ different elements from the set $[2^B]$.

Note here that each active user contributes a single non-zero coefficient in $\tilde{x}^{(m)}$ thereby resulting in $K_a$—sparse $2^B$—dimensional vector. Since $K_a$ is much smaller than the total number of codewords $2^B$, $\tilde{x}^{(m)}$ has a very small sparsity ratio $$\lambda \triangleq \frac{K_a}{2^B}.$$

Observe also that the formulation in (6) belongs to the MMV class in compressed sensing terminology, which can be equivalently rewritten in a more succinct matrix/matrix form as follows:

$$\tilde{Y} = \tilde{C} \tilde{X} + \tilde{W}, \quad (7)$$

in which $\tilde{Y} = [\tilde{y}^{(1)}, \tilde{y}^{(2)}, \ldots, \tilde{y}^{(M_r)}]$ is the entire measurement matrix and $\tilde{X} = [\tilde{x}^{(1)}, \tilde{x}^{(2)}, \ldots, \tilde{x}^{(M_r)}]$. With this formulation, the unknown matrix $\tilde{X}$ is row-sparse and we aim to exploit this structure by casting our task into the problem of estimating a group-sparse vector from a set of linear measurements. The theory of sparse reconstruction from noisy observations has been a hot research topic in statistics and we refer the theoretically inclined reader to chap. 7-9 in [21], for elaborate discussions on the theoretical guarantees for sparse reconstruction.

Proposed Unsourced Random Access Scheme Based on Compressive Sensing

A. Slotted Transmission Model and Code Selection

By revisiting (1), we see that the number of codewords grows exponentially with the blocklength n. Indeed, for a fixed rate $$R = \frac{B}{n},$$

we have $2^B = 2^{nR}$—which becomes extremely large even at moderate values of n—thereby making any attempt to directly use standard sparse recovery algorithms computationally prohibitive. Practical approaches have been introduced to alleviate this computational burden, including the slotted transmission framework also adopted in this disclosure. Indeed, similar to [8], each active user partitions its B—bit message into L equal-size information bit sequences (or chunks). As opposed to [8], however, our approach does not require concatenated coding to couple the sequences across different slots (i.e., no outer binary encoder). Therefore, we simply share the bits uniformly between the L slots and do not optimize the sizes of the L sequences. In this way, there is a total number of $$J = \frac{B}{L}$$

bits in each sequence (i.e., associated to each slot).

Let the matrix $$\tilde{A} \in \mathbb{C}^{\frac{n}{L} \times 2^J}$$

denote the common codebook for all the users (over all slots). That is, the columns of $\tilde{A}=[\tilde{a}_1, \tilde{a}_2, \ldots, \tilde{a}_{2^J}]$ form a set of codewords that each $\{k^{th}\}_{k=1}^{K_a}$ active user chooses from in order to encode its $\{l^{th}\}_{l=1}^{L}$ sequence before transmitting it over the $\{l^{th}\}_{l=1}^{L}$ slot. Notice here that, in such a slotted transmission framework, the size of the codebook is $2^J$. This is much smaller than the original codebook size, $2^B$, which was actually used to prove the random coding achievability bound in [7]. Slotting is, however, a necessary step towards alleviating the computational burden as mentioned previously. Yet, it is still essential for our proposed scheme to choose a sufficiently large value for J such that the expected number of collisions remains small as compared to the number of users. More specifically, from the union bound estimate, it necessary that $$\frac{2L\binom{K_a}{2}}{K_a 2^J}$$

does not dominate the probability of incorrect decoding. The simulation results, presented later, suggest that $J=17$ is enough to keep the contribution of collision-induced errors to the overall error probability negligible.

B. Encoding

After partitioning each packet/message into L J-bit information sequences, the latter are encoded separately using the codebook, $$\tilde{A} \in \mathbb{C}^{\frac{n}{L} \times 2^J},$$

which will serve as the sensing matrix for sparse recovery. Conceptually, we operate on a per-slot basis by associating to every possible J-bit information sequence a different column in the codebook matrix $\tilde{A}$. Thus, we can view this matrix as a set of potentially transmitted messages over the duration of a slot. The multiuser CS encoder can be visualized as an abstract multiplication of $\tilde{A}$ by an index vector v. The positions of non-zero coefficients in v are nothing but the decimal representations of the information bit sequences/chunks being transmitted by the active users over a given slot. Thus, the slotted transmission of the B-bit packets of all the active users gives rise to L small-size compressed sensing instances (one per each slot). Now, after encoding its J-bit sequence, user k modulates the corresponding codeword and transmits it over the channel where it is being multiplied by a complex coefficient $h_{k,m}$ before reaching the mth antenna. Hence, the overall baseband model over each slot reduces to the MAC model previously discussed. Hence, by recalling (7), the received signal over the lth slot is given by:

$$\tilde{Y}_l = \tilde{A}\tilde{X}_l + \tilde{W}_l, l=1, \ldots, L. \tag{8}$$

Vectorizing (8) yields:

$$vec(\tilde{Y}_l^T) = (\tilde{A}^T \otimes I) vec(\tilde{X}_l^T) + vec(\tilde{W}_l^T), \tag{9}$$

in which ⊗ denotes the Kronecker product of two matrices. Then, by defining $$\tilde{\mathbb{A}} \triangleq \tilde{A}^T \otimes I \in \mathbb{C}^{\frac{n}{L}M_r \times 2^J M_r}, \tilde{y}_l \triangleq vec(\tilde{Y}_l^T) \in \mathbb{C}^{\frac{n}{L}M_r},$$

$$\tilde{x}_l \triangleq vec(\tilde{X}_l^T) \in \mathbb{C}^{2^J M_r}, \text{ and } \tilde{w}_l \triangleq vec(\tilde{W}_l^T)$$

we recover the problem of estimating a sparse vector, $\tilde{h}_l$, from its noisy linear observations:

$$\tilde{y}_l = \tilde{\mathbb{A}}\tilde{x}_l + \tilde{w}_l, l=1, \ldots, L. \tag{10}$$

Figure 1A:
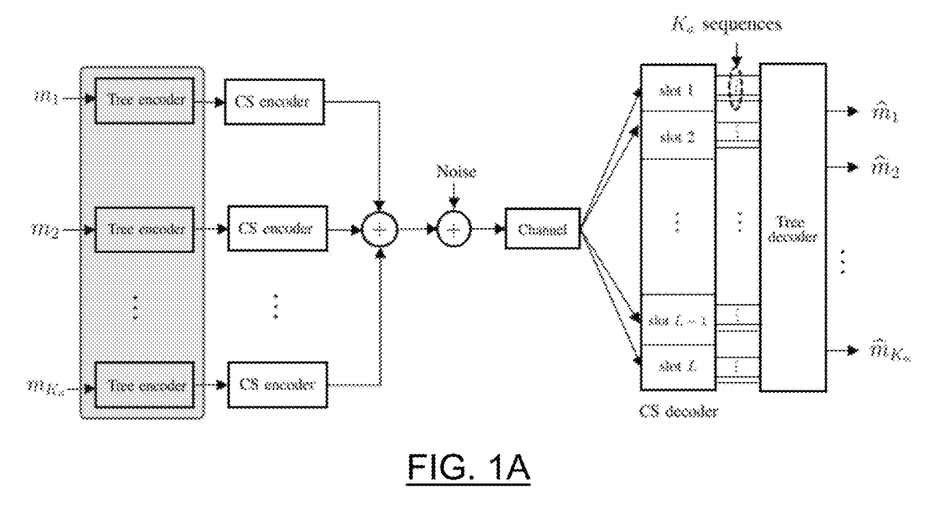
FIGS. 1A and 1B are high-level descriptions of the (existing) coded/coupled and the (proposed) uncoded/uncoupled CS-based unsourced random access schemes, respectively. The main differences lie in i) removing the outer tree encoder which is highlighted in purple colour in the top figure and ii) replacing the computationally intensive outer tree decoder by a simple clustering-type decoder.
Figure 1B:
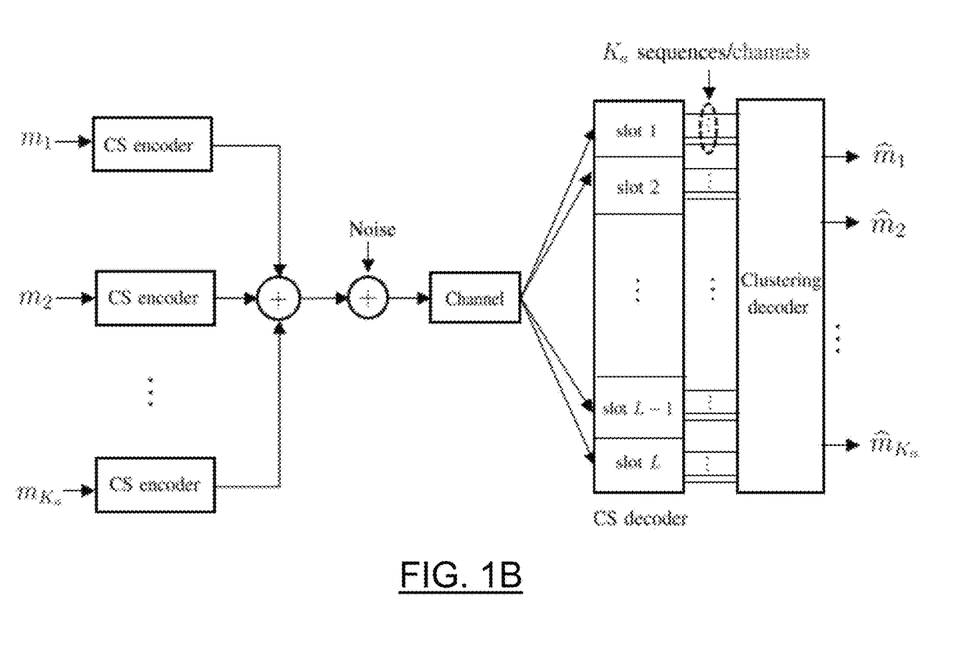

FIG. 1 schematically depicts the proposed URA scheme and contrasts it to the existing coded/coupled compressed sensing-based scheme. As seen there, the proposed scheme eliminates concatenated coding, i.e., the outer tree encoder. Indeed, instead of coupling the slot-wise information sequences through additional parity-check bits to be able to stitch them at the receiver, the proposed scheme leverages the inherent coupling provided by nature in the form of channel correlations across slots. In other words, if one is able to find the assignment matrix that clusters the slot-wise reconstructed channels for each user together, then the decoded sequences can also be clustered (i.e., stitched) in the same way. To better reconstruct the channels, this disclosure postulates a Bernoulli-Laplacian distribution as a heavy-tailed prior on $h_{k,m}$. The rationale for this choice will be discussed in some depth hereinafter. Since the Laplacian distribution is defined for real-valued random variables only, we transform the complex-valued model in (10) into its equivalent real-valued model as follows:

$$\underbrace{\begin{bmatrix} \Re\{\tilde{y}_l\} \\ \Im\{\tilde{y}_l\} \end{bmatrix}}_{\triangleq \bar{y}_l} = \underbrace{\begin{bmatrix} \Re\{\tilde{\mathbb{A}}\} & -\Im\{\tilde{\mathbb{A}}\} \\ \Im\{\tilde{\mathbb{A}}\} & \Re\{\tilde{\mathbb{A}}\} \end{bmatrix}}_{\triangleq \bar{\mathbb{A}}} \underbrace{\begin{bmatrix} \Re\{\tilde{x}_l\} \\ \Im\{\tilde{x}_l\} \end{bmatrix}}_{\triangleq \bar{x}_l} + \underbrace{\begin{bmatrix} \Re\{\tilde{w}_l\} \\ \Im\{\tilde{w}_l\} \end{bmatrix}}_{\triangleq \bar{w}_l} \tag{11}$$

Finally, by defining $$M \triangleq \frac{2nM_r}{L}, \text{ and } N \triangleq 2M_r 2^J,$$

the goal is to reconstruct the unknown sparse vector, $\bar{x}_l \in \Re^N$, given by:

$$\bar{x}_l = [\Re\{\tilde{x}_{1,l}\}^T, \ldots \Im\{\tilde{x}_{2^J,l}\}^T, \iota\{\tilde{x}_{1,l}\}^T, \ldots,$$
$$\iota\{\tilde{x}_{2^J,l}\}^T]^T \tag{12}$$

based on the knowledge of $y_l \in \Re^M$ and $\tilde{\mathbb{A}} \in \Re^{M \times N}$. We emphasize here the fact that $\bar{x}_l$ has a block-sparsity structure with dependent blocks since whenever $\Re\{\tilde{x}_{j,l}\}=0$ then $\iota\{\tilde{x}_{j,l}\}=0$.

For ease of exposition, we slightly rewrite (11) to end up with a convenient model in which we are interested in reconstructing the following group sparse vector:

$$x_l = [\underbrace{\Re\{\tilde{x}_{1,l}\}^T, \Im\{\tilde{x}_{1,l}\}^T}_{x_{1,l}}, \ldots, \underbrace{\Re\{\tilde{x}_{2^J,l}\}, \Im\{\tilde{x}_{2^J,l}\}^T}_{x_{2^J,l}}]^T, \quad (13)$$

which has independent sparsity among its constituent blocks $\{x_{j,l}\}_{j=1}^{2^J}$. To achieve this, observe that $x_l$ and $\bar{x}_l$ are related as follows:

$$x_l = \Pi \bar{x}_l, \quad (14)$$

for some know permutation matrix, $\Pi$, which satisfies $\Pi^T \Pi = I$. By plugging (14) in (11), we obtain the following equivalent CS problem:

$$y_l = Ax_l + w_l \text{ with } A \triangleq \bar{A}\Pi^T. \quad (15)$$

C. Cs Recovery and Clustering-Based Stitching

The ultimate goal at the receiver is to identify the set of B-bit messages that were transmitted by all the active users. Since the messages were partitioned into L different chunks, we obtain an instance of unsourced MAC in each slot. The inner CS-based decoder now decodes, in each slot, the J-bit sequences of all the $K_a$ active users. The outer clustering-based decoder will put together the slot-wise decoded sequences of each user, so as to recover all the original transmitted B-bit messages (cf. FIG. 1 for more details).

For each lth slot, the task is then to first reconstruct $x_l$ from $y_l = Ax_l + w_l$ given $y_l$ and A. To solve the joint activity detection and channel estimation problem, we resort to the HyGAMP CS algorithm [22] and we will also rely on the EM-concept [23] to learn the unknown hyperparameters of the model. In particular, we embed the EM algorithm inside HyGAMP to learn the variances of the additive noise and the postulated prior, which are both required to execute HyGAMP itself. HyGAMP makes use of large-system Gaussian and quadratic approximations for the messages of loopy belief propagation on the factor graph. As opposed to GAMP [24], HyGAMP is able to accommodate the group sparsity structure in $x_l$ by using a dedicated latent Bernoulli random variable, $\varepsilon_j$, for each $\{j^{th}\}_{j=1}^{2^J}$ group, $x_{j,l}$, in $x_l$. We will soon see how HyGAMP finds the MMSE and MAP estimates, $\{\hat{x}_{j,l}\}_{j=1}^{2^J}$ and $\{\hat{\varepsilon}_j\}_{j=1}^{2^J}$ of $\{x_{j,l}\}_{j=1}^{2^J}$ and $\{\varepsilon_j\}_{j=1}^{2^J}$. The latter will be in turn used to decode the transmitted sequences in each slot (up to some unknown permutations) while by clustering the MMSE estimates of the active users' channels it is possible to recover those unknown permutations and correctly stitch the decoded sequences. For this reason, we denote the $K_a$ reconstructed channels over each lth slot (i.e., the nonzero blocks in the entire reconstructed vector $\hat{x}_l = [\hat{x}_{1,l}, \hat{x}_{2,l}, \ldots, \hat{x}_{2^J,l}]^T$ as $\{\hat{h}_{k,l}\}_{k=1}^{K_a}$. By denoting, the residual estimation noise as $\hat{w}_{k,l}$, it follows that:

$$\hat{h}_{k,l} = \bar{h}_k + \hat{w}_{k,l}, k=1,\ldots,K_a, l=1,\ldots,L, \quad (16)$$

in which $\bar{h}_k \triangleq [\Re\{h_k\}, \Im\{h_k\}]^T$ with $h_k \triangleq [h_{k,1}, h_{k,2}, \ldots, h_{k,M_r}]^T$ is the true complex channel vector for user k. The outer clustering-based decoder takes the $LK_a$ reconstructed channels in (16)—which are slot-wise permuted—and returns one cluster per active user, that contains its L noisy channel estimates.

To cluster the reconstructed channels into $K_a$ different groups, we resort to the Gaussian mixture expectation-maximization procedure which consists of fitting a Gaussian mixture distribution to the data points in (16) under the assumption of Gaussian residual noise. We also assume the reconstruction noise to be Gaussian which is a common practice in the approximate message passing framework including HyGAMP. However, as seen from (11) the matrix $\bar{A}$ is not i.i.d Gaussian as would be required to rigorously prove the above claim which is a widely believed conjecture based on the concept of universality from statistical physics [25], [26]. Moreover, we will devise an appropriate constrained clustering procedure that enforces the following two constraints that are very specific to our problem: i) each cluster has exactly L data points, and ii) channels reconstructed over the same slot are not assigned to the same cluster.

D. Hybrid Approximate Message Passing

In this section, we describe the HyGAMP CS algorithm [22] by which we estimate the channels and decode the data in each slot. As a matter of fact, decoding the transmitted messages in slot l comes as a byproduct of reconstructing the entire group-sparse vector $x_l$. This is because there is a one-to-one mapping between the positions of the non-zero blocks in $x_l$ and the transmitted codewords that are drawn from the common codebook $\tilde{A}$. As mentioned earlier, HyGAMP finds asymptotic MMSE estimates for the entries of the group-sparse vector, $x_l$, in each slot l. To capture the underlying group sparsity structure, HyGAMP uses the following set of Bernoulli latent random variables:

$$\varepsilon_j = \begin{cases} 1 & \text{if group } j \text{ is active,} \\ 0 & \text{if group } j \text{ is inactive,} \end{cases} \quad (17)$$

which are i.i.d with the common prior $$\lambda \triangleq Pr(\varepsilon_j = 1) = \frac{K_a}{2^J}.$$

The marginal posterior probabilities, $Pr(\varepsilon_j=1|y_l)$, for $j=1,2,\ldots,2^J$ are given by:

$$Pr(\varepsilon_j = 1 | y_l) = \frac{\lambda}{\lambda + (1-\lambda)\exp\left(-\sum_{q=1}^{2M_r} LLR_{q \to j}^{(l)}\right)}, \quad (18)$$

where $LLR_{q \to j}^{(l)}$ is updated in line 19 of Algorithm 1 (see FIG. 1C) while trying to reconstruct the unknown channels[2]. The posterior probabilities, $\{Pr(\varepsilon_j=1|y_l)\}_{j=1}^{2^J}$, are used by the receiver to infer which of the codewords were transmitted by the active users over slot l. This is done by simply returning the columns in $\tilde{A}$ that correspond to the $K_a$ largest values among the posterior probabilities in (18).

Figure 2:
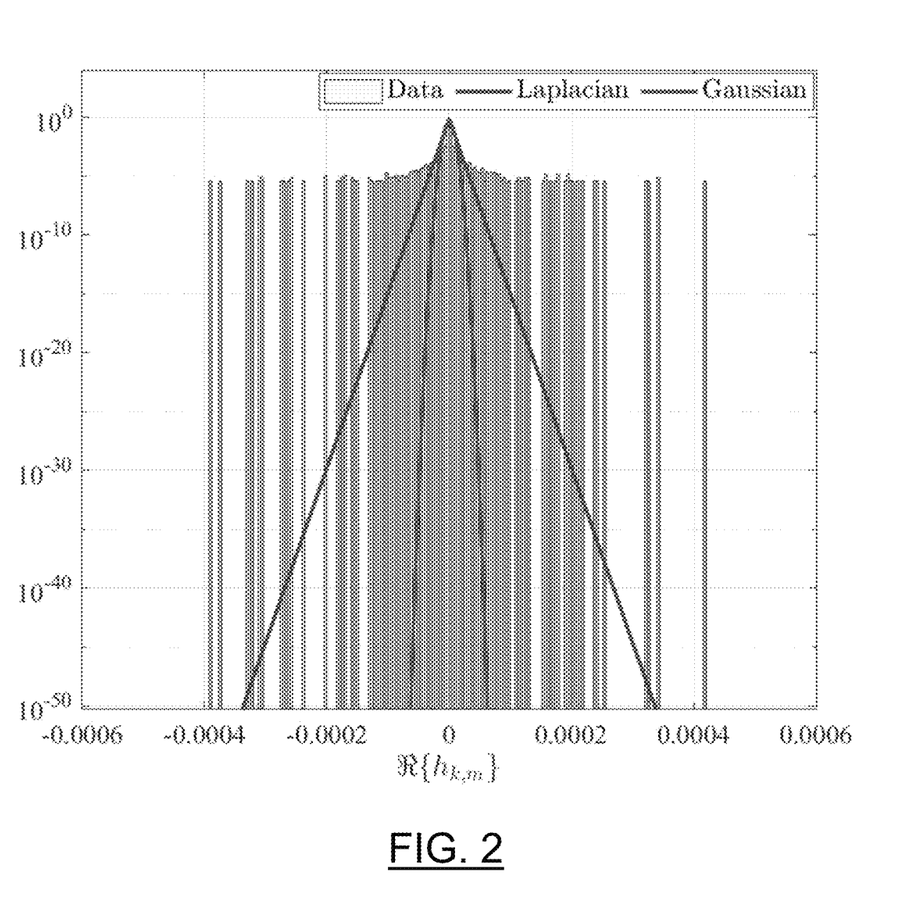
FIG. 2 is a histogram of the channel coefficients (real part) together with the Laplacian and Gaussian PDFs fitted to it.

Note here that for the sake of simplicity, we assume the number of active users, $K_a$, to be known to the receiver as is the case in all existing works on unsourced random access. Yet, we emphasize the fact that it is straightforward to generalize our approach to also detect the number of active users by learning the hyperparameter $$\lambda = \frac{K_a}{2^J}$$

using the EM procedure as done in [27]. Motivated by our recent results in [28], we also postulate a Bernoulli-Laplacian prior to model the channel coefficients. The main rationale behind choosing this prior is the use of a heavy-tailed distribution to capture the effect of the large-scale fading coefficients, $\sqrt{g_k}$, which vary drastically depending on the relative users' locations with respect to the BS. Indeed, unlike most AMP-based works on massive activity detection (e.g., [29]) which assume perfect knowledge of the large-scale fading coefficients, in our disclosure the latter are absorbed in the overall channel coefficients and estimated with them using HyGAMP. Therefore, we had to opt for a heavy-tailed prior to capture the rare events of getting an active user close to the base station and whose channel will be very large compared to most of the other faraway active users. In this respect, the Bernoulli-Laplacian prior was found to offer a good trade-off between denoising difficulty and model-mismatch. The Bernoulli-Laplacian is also computationally more attractive than other heavy-tailed priors since it requires updating only one parameter using the nested EM algorithm (inside HyGAMP) as will be explained later on. As an empirical evidence, in FIG. 2, we plot the Laplacian distribution:

$$\mathcal{L}(x; \sigma_x) = \frac{1}{2\sigma_x} e^{-\frac{|x|}{\sigma_x}}, \tag{19}$$

with $\sigma_x = \sqrt{\sigma^2/2}$, wherein $\sigma^2$ is the empirical variance of the data that is extracted from active users' channels only, i.e., $\Re\{h_{k,m}\} = \sqrt{g_k}\Re\{\tilde{h}_{k,m}\}$. FIG. 2 also depicts the Gaussian pdf after fitting it to the same data set. There, it is seen that the Laplacian prior exhibits a better fit to the data and we noticed that owing to its heavier tail it enables HyGAMP to better capture both cell-center and cell-edge users.

In the sequel, we provide more details about HyGAMP alone which runs according to the algorithmic steps provided in Algorithm 1. In our description, we assume that the hyperparameters $\sigma_x$ and $\sigma_w^2$ to be perfectly known to the receiver. Later on, we will explain how to also learn these two parameters from the data using the EM algorithm. For ease of exposition, the vector $x_l$ to be reconstructed, in slot l, will be generically denoted as x since HyGAMP will be executed in each slot separately (same thing for $y_l$ and all other quantities that depend on the slot index l). The underlying block-sparse vector, x, consists of V blocks each of which consisting of $2M_r$ components, i.e., $$x \triangleq [x_1^T, x_2^T, \ldots, x_{2^J}^T]^T, \tag{20}$$

with $$x_j \triangleq [x_{1,j}, x_{2,j}, \ldots, x_{2M_r,j}]^T, \tag{21}$$

Similarly, the known sensing matrix, A, in (15) is partitioned into the corresponding $2^J$ blocks as follows:

$$A = [A^{(1)}, A^{(2)}, \ldots, A^{(2^J)}] \text{ with } A^{(j)} \in \Re^{M \times 2M_r} \forall j. \tag{22}$$

Recall also that $$M = \frac{2nM_r}{L}$$

and $N=2^J(2M_r)$ denote the number of rows and columns in A, respectively.

Figure 3:
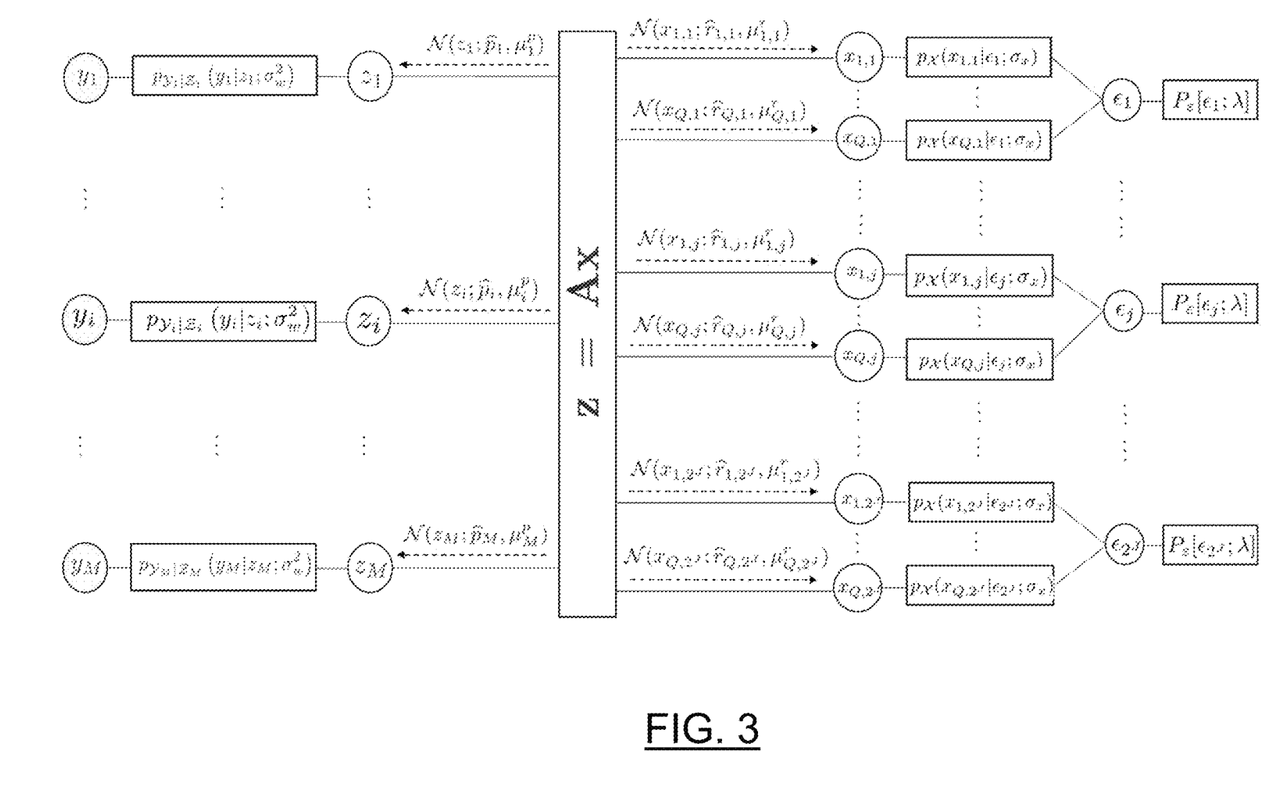
FIG. 3 is a factor graph associated to the model in Equation (15): $Q=2M_r$, $P_\varepsilon[\in_j; \lambda]$ is the prior on $\varepsilon_j$ given in Equation (17), $p\chi(x_{q,j}|\in_j; \sigma_x)$ is the Bernoulli-Laplacian prior on $x_{q,j}$ given in Equation (23).

HyGAMP passes messages along the edges of the factor graph pertaining to the model in (15) which is depicted in FIG. 3. There, the components of each block $x_j$ are connected to the same latent variable $\varepsilon_j$. The latter sends its belief (updated in line 20 of Algorithm 1) about each component of the block, being zero or non-zero. This updated belief is based on the information harvested from the other components of the same block (line 19 of Algorithm 1). In FIG. 3, the Gaussian messages that are broadcast from the linear mix, z=Ax, to the variables nodes, $x_{q,j}$ and $z_i$, are highlighted in blue color. Their means and variances $\hat{r}_{q,i}$, $\hat{\mu}_{q,j}^r$, $\hat{p}_i$, and $\hat{\mu}\text{ip}$ are updated in lines 9, 10, 17, and 18 of Algorithm 1. The estimates of the unknown components in the group sparse vector are updated through the MMSE denoising step in line 8 and the associated variances are updated in line 9. As a starting point, we initialize $\hat{r}_{q,j}$ and $\mu_{q,j}^r$ $\forall q,j$ to 0 and 1, respectively. The LLRs and sparsity-level are initialized as in lines 5 and 6, respectively. As will be better appreciated later, some of the updates are derived based on the particular choice of the common prior which is Bernoulli-Laplacian in this disclosure, i.e.:

$$p_x(x_{q,j}|\varepsilon_j; \sigma_x) = (1-\varepsilon_j)\delta(x_{q,j}) + \varepsilon_j \mathcal{L}(x_{q,j}; \sigma_x), \tag{23}$$

where $\mathcal{L}(x; \sigma_x)$ is given in (19) and $\delta(x)$ is the Dirac delta distribution. The updates for $\hat{z}_i^0$ and $\mu_i^z$ (in lines 13 and 14) hold irrespectively of the prior since they depend only on the output distribution, namely, $$p_{y|z}(y|z; \sigma_w^2) = \prod_{i=1}^M p_{y_i|z_i}(y_i|z_i; \sigma_w^2), \tag{24}$$

in which z=Ax. Due to the AWGN channel assumption, our output distribution is Gaussian and we have the following updates readily available from [24]:

$$\hat{z}_i^0(t) = \frac{\mu_i^p y_i + \sigma_w^2 \hat{p}_i}{\mu_i^p + \sigma_w^2} \tag{25}$$

$$\mu_i^z(t) = \frac{\mu_i^p \sigma_w^2}{\mu_i^p + \sigma_w^2}. \tag{26}$$

The updates in lines 8 and 9, however, depend on the particular choice of the prior and as such are expressed as function of the other outputs of HyGAMP. In this disclosure, we only provide the final expressions of the required updates under the Bernoulli-Laplacian prior given in (23). We omit the derivation details for sake of briefness since they are based on some equivalent algebraic manipulations as recently done in [28] in the absence of group sparsity. For notational convenience, we also introduce the following intermediate quantities to express the required updates, for q=1, and j=1, . . . , $2^J$ (some variables are defined in Algorithm 1):

$$\theta_{q,j} \triangleq 2\sigma_x \frac{(1-\hat{\rho}_{q,j})}{\hat{\rho}_{q,j}\sqrt{2\pi\mu_{q,j}^r}} \tag{27}$$

$$\alpha_{q,j}^- \triangleq -\frac{\hat{r}_{q,j}}{\sigma_x} - \frac{\mu_{q,j}^r}{2\sigma_x^2}, \tag{28}$$

$$\alpha_{q,j}^+ \triangleq A\frac{\hat{r}_{q,j}}{\sigma_x} - \frac{\mu_{q,j}^r}{2\sigma_x^2}. \tag{29}$$

$$\gamma_{q,j}^- \triangleq \hat{r}_{q,j} + \frac{\mu_{q,j}^r}{\sigma_x}, \tag{30}$$

$$\gamma_{q,j}^+ \triangleq \hat{r}_{q,j} - \frac{\mu_{q,j}^r}{\sigma_x}. \tag{31}$$

It is worth mentioning here that those quantities depend on the unknown parameter $\sigma_x$ of the Laplacian distribution. Therefore, on top of being updated by HyGAMP, these $\sigma_x$-dependent quantities are also updated locally by the nested EM algorithm that learns the unknown parameter $\sigma_x$ itself. We also define the following two intermediate $\sigma_x$-independent quantities:

$$v_{q,j}^+ \triangleq Q\left(-\frac{\gamma_{q,j}^+}{\sqrt{\mu_{q,j}^r}}\right) e^{\frac{(\gamma_{q,j}^+)^2}{2\mu_{q,j}^r}}, \quad (32)$$

$$v_{q,j}^- \triangleq Q\left(\frac{\gamma_{q,j}^-}{\sqrt{\mu_{q,j}^r}}\right) e^{\frac{(\gamma_{q,j}^-)^2}{2\mu_{q,j}^r}}, \quad (33)$$

in which Q(•) is the standard Q-function, i.e., the tail of the normal distribution:

$$Q(x) = \frac{1}{\sqrt{2\pi}} \int_x^{+\infty} e^{-\frac{t^2}{2}} dt. \quad (34)$$

Using the above notations, we establish the closed-form expressions[3] for $\hat{x}_{q,j}(t)$ required in line 8 of Algorithm 1 as given in (36). For ease of notation, we drop the iteration index, t, for all the statistical quantities updated by HyG-AMP. The reader is referred to Algorithm 1 to keep track of the correct iteration count. The posterior variance, $\mu_{q,j}^x$, required in line 9 is given by:

$$\mu_{q,j}^x(t) = \sigma_{x_{q,j}}^2(t) - \hat{x}_{q,j}(t)^2, \quad (35)$$

wherein $\sigma_{x_{q,j}}^2(t)$ is defined as follows:

$$\sigma_{x_{q,j}}^2(t) \triangleq \mathbb{E}_{x_{q,j}|y}\{x_{q,j}^2 | y; \hat{r}_{q,j}(t-1), \mu_{q,j}^r(t-1), \hat{p}_{q,j}(t), \sigma_x\},$$

and its closed-form expression is given by (37).

[3] For full derivation details, see the most recent Arxiv version.

$$\hat{x}_{q,j} = \left(\frac{1}{\gamma_{q,j}^- + \gamma_{q,j}^+ \frac{v_{q,j}^+}{v_{q,j}^-}} + \frac{1}{\gamma_{q,j}^+ + \gamma_{q,j}^- \frac{v_{q,j}^-}{v_{q,j}^+}} + \frac{\theta_{q,j}}{\gamma_{q,j}^+ v_{q,j}^+ + \gamma_{q,j}^- v_{q,j}^-}\right)^{-1}. \quad (36)$$

$$\frac{1}{\sigma_{x_{q,j}}^2} = \left([(\gamma_{q,j}^-)^2 + \mu_{q,j}^r] + [(\gamma_{q,j}^+)^2 + \mu_{q,j}^r]\frac{v_{q,j}^+}{v_{q,j}^-} - \frac{2(\mu_{q,j}^r)^2}{\sigma_x\sqrt{2\pi\mu_{q,j}^r} v_{q,j}^-}\right)^{-1} + \quad (37)$$

$$\left([(\gamma_{q,j}^+)^2 + \mu_{q,j}^r] + [(\gamma_{q,j}^-)^2 + \mu_{q,j}^r]\frac{v_{q,j}^-}{v_{q,j}^+} - \frac{2(\mu_{q,j}^r)^2}{\sigma_x\sqrt{2\pi\mu_{q,j}^r} v_{q,j}^+}\right)^{-1} +$$

$$\theta_{q,j}\left([(\gamma_{q,j}^+)^2 + \mu_{q,j}^r]v_{q,j}^+ + [(\gamma_{q,j}^-)^2 + \mu_{q,j}^r]v_{q,j}^- - \frac{2(\mu_{q,j}^r)^2}{\sigma_x\sqrt{2\pi\mu_{q,j}^r}}\right)^{-1}.$$

The closed-form expression for the LLR update in line 19 of Algorithm 1 was also established as follows:

$$LLR_{q \to j} = \log\left(\frac{\sqrt{2\pi\mu_{q,j}^r}}{2\sigma_x}[v_{q,j}^+ + v_{q,j}^-]\right). \quad (38)$$

We also resort to the maximum likelihood (ML) concept in order to estimate the unknown hyperparameters $\sigma_x$ and $\sigma_w^2$. More specifically, the ML estimate of the noise variance is given by:

$$\hat{\sigma}_w^2 = \frac{1}{M}\sum_{i=1}^{M}(y_i - \hat{z}_i)^2 + \mu_i^z, \quad (39)$$

where $\hat{z}_i \triangleq (A\hat{x})_i$. Unfortunately, the ML estimate (MLE), $\hat{\sigma}_x$, of $\sigma_x$, cannot be found in closed form and we use the EM algorithm instead to find the required MLE iteratively. Indeed, starting from some initial guess, $\hat{\sigma}_{x;0}$, we establish the (d+1)th MLE update as follows:

$$\hat{\sigma}_{x;d+1} = \frac{1}{\sum_{q,j}\hat{p}_{q,j}}\sum_{q,j}\frac{\hat{p}_{q,j}\kappa_{q,j;d}}{2\hat{\sigma}_{x;d}\psi_{q,j;d}}, \quad (40)$$

in which the quantities $\psi_{q,j;d}$ and $\kappa_{q,j;d}$ are given by:

$$\psi_{q,j;d} = \frac{\hat{p}_{q,j}}{2\sigma_{x;d}}\left[e^{-\alpha_{q,j;d}^-}Q\left(\frac{\gamma_{q,j;d}^-}{\sqrt{\mu_{q,j}^r}}\right) + e^{-\alpha_{q,j;d}^+}Q\left(-\frac{\gamma_{q,j;d}^+}{\sqrt{\mu_{q,j}^r}}\right)\right] + \quad (41)$$

$$(1-\hat{p}_{q,j})e^{-\frac{r_{q,j}^2}{2\mu_{q,j}^r}},$$

$$\kappa_{q,j;d} = \gamma_{q,j;d}^+ e^{-\alpha_{q,j;d}^+}Q\left(\frac{\gamma_{q,j;d}^+}{\sqrt{\mu_{q,j}^r}}\right) - \quad (42)$$

$$\gamma_{q,j;d}^- e^{-\alpha_{q,j;d}^-}Q\left(\frac{\gamma_{q,j;d}^-}{\sqrt{\mu_{q,j}^r}}\right) + \frac{2\mu_{q,j}^r}{\sqrt{2\pi\mu_{q,j}^r}}e^{-\frac{r_{q,j}^2}{2\mu_{q,j}^r}}.$$

Note here that $\gamma_{q,j;d}^+$, $\gamma_{q,j;d}^-$, $\alpha_{q,j}^+$, and $\alpha_{q,j;d}^-$ involved in (41)-(42) are also expressed as in (28)-(31), except the fact that $\sigma_x$ is now replaced by $\hat{\sigma}_{x;d}$.

E. Constrained Clustering-Based Stitching Procedure

In this section, we focus on the problem of clustering the reconstructed channels from all the slots to obtain one cluster per user. By doing so, it will be easy to cluster (i.e., stitch) the slot-wise decoded sequences of all users so as to recover their transmitted messages/packets. To that end, we first estimate the large-scale fading coefficients from the outputs of HyGAMP as follows:

$$\hat{g}_{k,l} = \frac{1}{M_r}\|\hat{h}_{k,l}\|_2^2, \quad (43)$$

where $\hat{h}_{k,l}$ is the kth reconstructed channel in slot l. The estimates of the different large-scale fading coefficients are required to re-scale the reconstructed channels before clustering. This is in order to avoid, for instance, having the channels of the cell-edge users clustered together due to their strong pathloss attenuation. To that end, we divide each $\hat{h}_{k,l}$ in (16) by the associated $\sqrt{\hat{g}_{k,l}}$ in (43) but keep using the same symbols, $\hat{h}_{k,l}$, for notational convenience.

We can then visualize (16)—after normalization—as one whole set of $K_a L$ data points in $\mathbb{R}^{2M_r}$:

$$\mathcal{H} = \{\hat{h}_{k,l} | k=1,\ldots,K_a, l=1,\ldots,L\}. \quad (44)$$

which gathers all the reconstructed small-scale fading coefficients pertaining to all $K_a$ active users and all L slots. Since the small scale-fading coefficients of each user are assumed to be Gaussian distributed, we propose to fit a Gaussian mixture distribution to the entire data set, $\mathcal{H}$, and use the EM algorithm to estimate the parameters of the involved mixture densities along with the mixing coefficients.

The rationale behind the use of clustering is our prior knowledge about the nature of the data set $\mathcal{H}$. Indeed, we know that there are $K_a$ users whose channels remain constant over all the slots. Therefore, each user contributes exactly L data points in $\mathcal{H}$ which are noisy estimates of its true channel vector. Our goal is hence to cluster the whole data set into $K_a$ different clusters, each of which having exactly L vectors. To do so, we denote the total number of data points in $\mathcal{H}$ by $N_{tot} \triangleq K_a L$ and assume that each data point is an independent realization of a Gaussian-mixture distribution with $K_a$ components:

$$p_{\hat{\mathcal{H}}}(\hat{h};\pi,\mu,\Sigma) = \sum_{k=1}^{K_a} \pi_k \mathcal{N}(\hat{h};\mu_k,\Sigma_k). \quad (45)$$

Here, $\pi \triangleq [\pi_1, \ldots, \pi_{K_a}]^T$ are the mixing coefficients, $\mu \triangleq [\mu_1, \ldots, \mu_{K_a}]^T$ are the clusters' means, and $\Sigma \triangleq [\Sigma_1, \ldots, \Sigma_{K_a}]^T$ are their covariance matrices.

The assumption we make here is justified by the fact that the residual reconstruction noise of AMP-like algorithms (including HyGAMP) is Gaussian-distributed. Notice that in (45) we considered a mixture of $K_a$ components, which amounts to assigning a Gaussian distribution to each active user. We now turn our attention to finding the likelihood function of all the unknown parameters[4], $\{\pi_k, \mu_k, \Sigma_k\}_{k=1}^{K_a}$, involved in (45). To that end, we use $\hat{h}_n$ to denote a generic data point in $\mathcal{H}$, i.e.:

$$\mathcal{H} = \{\hat{h}_{k,l} \mid k=1, \ldots, K_a, \; l=1, \ldots, L\}, \quad (46) \text{ and } (47),$$
$$= \{\hat{h}_n \mid n = 1, \ldots, N_{tot}\}.$$

respectively, from top to bottom Owing to the i.i.d assumption on the data, the associated likelihood function factorizes as follows:

$$p_{\hat{\mathcal{H}}_1,\ldots,\hat{\mathcal{H}}_{N_{tot}}}(\hat{h}_1, \ldots, \hat{h}_{N_{tot}};\pi,\mu,\Sigma) = \prod_{n=1}^{N_{tot}} p_{\hat{\mathcal{H}}_1}(\hat{h}_n; \pi,\mu,\Sigma). \quad (48)$$

Taking the logarithm of (48) yields the following log-likelihood function (LLF):

$$\mathfrak{L}(\pi, \mu, \Sigma) \triangleq \ln p_{\hat{\mathcal{H}}_1,\ldots,\hat{\mathcal{H}}_{N_{tot}}}(\hat{h}_1, \ldots, \hat{h}_{N_{tot}}; \pi, \mu, \Sigma), \quad (49)$$
$$= \sum_{n=1}^{N_{tot}} \ln\left(\sum_{k=1}^{K_a} \pi_k \mathcal{N}\left(\hat{h}_n; \mu_k, \sum_k\right)\right).$$

Our task is to then maximize the LLF with respect to the unknown parameters, i.e.:

$$\arg\max_{\pi_k, \mu_k, \Sigma_k} \sum_{n=1}^{N_{tot}} \ln\left(\sum_{k=1}^{K_a} \pi_k \mathcal{N}\left(\hat{h}_n; \mu_k, \sum_k\right)\right). \quad (50)$$

Unfortunately, it is not possible to obtain a closed-form solution to the above optimization problem. Yet, the EM algorithm can again be used to iteratively update the ML estimates of the underlying parameters. In the sequel, we will provide the resulting updates, and we refer the reader to Chap. 9 of [30] for more details.

[4] Note here that we refer to each $\mu_k$ and $\Sigma_k$ as parameters although strictly speaking they are vectors and matrices of unknown parameters.

We initialize the means, $\{\mu_k\}_{k=1}^{K_a}$, using k-means++ sample which outputs the $K_a$ centroids of the original data set. Covariance matrices, $\{\Sigma_k\}_{k=1}^{K_a}$, are initialized to be diagonal with the diagonal elements chosen as the means of the rows of the data set, and mixing coefficients $\{\pi_k\}_{k=1}^{K_a}$ are initialized uniformly as $1/K_a$. Then, the three steps for learning the parameters of the above Gaussian mixture model are as follows:

Expectation step (E-STEP)

$$Pr(\hat{h}_n \in \text{cluster } k) = \frac{\pi_k \mathcal{N}\left(\hat{h}_n; \mu_k, \sum_k\right)}{\sum_{k=1}^{K_a} \pi_k \mathcal{N}\left(\hat{h}_n; \mu_k, \sum_k\right)}. \quad (51)$$

Maximization step (M-STEP)

(52)-(56) respectively, from top to bottom $$\mu_k^{new} = \frac{1}{N_k} \sum_{n=1}^{N_{tot}} Pr(\hat{h}_n \in \text{cluster } k)\hat{h}_n,$$

$$\sum_k^{new} = \frac{1}{N_k} \sum_{n=1}^{N_{tot}} Pr(\hat{h}_n \in \text{cluster } k) \times (\hat{h}_n - \mu_k^{new})(\hat{h}_n - \mu_k^{new})^\top,$$

$$N_k = \sum_{n=1}^{N_{tot}} Pr(\hat{h}_n \in \text{cluster } k),$$

$$\pi_k^{new} = \frac{N_k}{N_{tot}}.$$

Evaluation step (Eval-STEP)

$$\mathfrak{L}(\pi^{new}, \mu^{new}, \sum^{new}) = \sum_{n=1}^{N_{tot}} \ln\left(\sum_{k=1}^{K_a} \pi_k^{new} \mathcal{N}\left(\hat{h}_n; \mu_k^{new}, \sum_k^{new}\right)\right). \quad (57)$$

In the E-STEP, we compute the probability of having a particular data point belong to each of the $K_a$ users. In the M-STEP, we update the means, covariance matrices, and the mixing coefficients for each of the clusters. We evaluate the LLF at each iteration to check the convergence of the EM-based algorithm, hence the Eval-STEP. Recall, however, that we are actually dealing with a constrained clustering problem since it is mandatory to enforce the following two intuitive constraints:

Constraint 1: Channels from the same slot cannot be assigned to the same user,

Constraint 2: Users/clusters should have exactly L channels/data points.

At convergence, the EM algorithm returns a matrix, P, of posterior membership probabilities, i.e., whose (n, k)th entry is $P_{nk}=Pr(\hat{h}_n \in \text{cluster } k)$. Since the EM solves an unconstrained clustering problem, relying directly on P would result in having two channels reconstructed from the same slot being clustered together, thereby violating "constraint 1" and/or "constraint 2". In what follows, we will still make use of P in order to find the best possible assignment of the $N_0$ reconstructed channels to the $K_a$ users (i.e., the one that minimizes the probability of error) while satisfying the two constraints mentioned above.

To enforce "constraint 2", we begin by partitioning P into L equal-size and consecutive blocks, i.e., $K_a \times K_a$ matrices $\{P^{(l)}\}_{l=1}^{L}$, as follows:

$$P = \begin{bmatrix} P^{(1)} \\ \cdots \\ \vdots \\ \cdots \\ P^{(L)} \end{bmatrix}. \tag{58}$$

Then, since each kth row in $P^{(l)}$ sums to one, it can be regarded as a distribution of some categorical random variable, $\mathcal{V}_{k,l}$, that can take on one of $K_a$ possible mutually exclusive states. For convenience, we represent these categorical random variables by 1-of-$K_a$ binary coding scheme. That is, each $\mathcal{V}_{k,l}$ is represented by a $K_a$-dimensional vector $v_{k,l}$ which takes values in $\{e_1, e_2, e_{K_a}\}$ where $e_i=[0, \ldots, 1, \ldots, 0]^T$ has a single 1 located at position i. We also denote the set of all $K_a \times K_a$ permutation matrices by $\mathcal{P}$.

We enforce "constraint 1" by using the following posterior joint distribution on $\{\mathcal{V}_{k,l}\}_{k=1}^{K_a}$ in each lth slot:

$$p_{v,1,\ldots,v_{K_a,l}}(v_{1,l}, \ldots, v_{K_a,l}) \propto \mathbb{I}(V_l \in \mathcal{P}) \prod_{k=1}^{K_a} p_{v_{k,l}}(v_{k,l}), \tag{59}$$

where $\mathbb{I}(\bullet)$ is the indicator function and $V_l \triangleq [v_{1,l}, \ldots, v_{K_a,l}]^T$. Moreover, it is clear that any categorical distribution with $K_a$ atoms can be parametrized in the following way:

$$p_{v_{k,l}}(v_{k,l}) = \exp\{\Sigma_{k'=1}^{K_a} \alpha_{k,k'}^{(l)} \mathbb{I}(v_{k,l}=e_{k'})\}, \tag{60}$$

in which $$\alpha_{k,k'}^{(l)} = \log p_{v_{k,l}}(v_{k,l}=e_{k'}) = \log P_{k,k'}^{(l)}. \tag{61}$$

Since our optimality criteria is the largest-probability assignment, we maximize the distribution in (59) which when combined with (60) yields:

$$p_{V_l}(V_l) = p_{v_{1,l},\ldots,v_{K_a,l}}(v_{1,l}, \ldots, v_{K_a,l}), \tag{62}$$

$$\propto \mathbb{I}(V_l \in \mathcal{P}) \prod_{k=1}^{K_a} \exp\left\{\sum_{k'=1}^{K_a} \alpha_{k,k'}^{(l)} \mathbb{I}(v_{k,l}=e_{k'})\right\},$$

$$= \mathbb{I}(V_l \in \mathcal{P}) \exp\left\{\sum_{k=1}^{K_a} \sum_{k'=1}^{K_a} \alpha_{k,k'}^{(l)} \mathbb{I}(v_{k,l}=e_{k'})\right\}.$$

Now, finding the optimal assignment inside slot l, subject to constraint 1, amounts to finding the optimal assignment matrix, $\hat{V}_l$, that maximizes the constrained posterior joint distribution, $p_{V_l}(V_l)$, established in (62), i.e.:

$$\hat{V}_l = \underset{V_l}{\operatorname{argmax}}\, p_{V_l}(V_l). \tag{63}$$

Owing to (62), it can be shown that finding $\hat{V}_l$ is equivalent to solving the following constrained optimization problem:

$$\underset{V_l}{\operatorname{argmax}} \sum_{k=1}^{K_a} \sum_{k'=1}^{K_a} \alpha_{k,k'}^{(l)} \mathbb{I}(v_{k,l}=e_{k'}) \tag{64}$$

subject to $$\begin{cases} \sum_{k'=1}^{K_a} \mathbb{I}(v_{k,l}=e_{k'}) = 1 \text{ for all } k \\ \sum_{k=1}^{K_a} \mathbb{I}(v_{k,l}=e_{k'}) = 1 \text{ for all } k' \end{cases} \tag{65}$$

Note that the constraints in (65) enforce the solution to be a permutation matrix. This follows from the factor, $\mathbb{I}(V_l \in \mathcal{P})$, in the posterior distribution established in (62) which assigns zero probability to non-permutation matrices.

This optimization problem can be solved in polynomial time by means of the Hungarian algorithm which has an overall complexity in the order of $\mathcal{O}(K_a^3)$. Stitching is achieved by means of the optimal assignment matrices, $\{\hat{V}_l\}_{l=1}^L$, which are used to cluster the reconstructed sequences, thereby recovering the original transmitted messages.

Simulation Results

A. Simulation Parameters

In this section, we assess the performance of the proposed URA scheme using exhaustive Monte-Carlo computer simulations. Our performance metric is the probability of error given in (4). We fix the number of information bits per user/packet to B=102, which are communicated over L=6 slots. This corresponds to J=17 information bits per slot. We also fix the bandwidth to W=10 MHz and the noise power to $P_w=10^{-19.9} \times W$ [Watts]. The path-loss parameters in (2) are set to $\alpha$=15.3 dB and $\beta$=3.76. The users are assumed to be uniformly scattered on an annulus centered at the base station and with inner and outer radiuses, $R_{in}$=5 meters and $R_{out}$=1000 meters, respectively. The distribution of each kth user random distance, $R_k$, from the base station is hence given by:

$$Pr(R_k < r_k) = \frac{r_k^2 - R_{in}^2}{R_{out}^2 - R_{in}^2}. \tag{66}$$

In the following, our baseline is the covariance-based scheme introduced recently in [15] which is simply referred to as CB-CS in this disclosure. For the CB-CS algorithm we fix the number of information bits per user/packet to B=104 bits which are communicated over L=17 slots. The parity bit allocation for the outer tree code was set to p=[0,8,8, . . . ,14]. We also use J=14 coded bits per slot which leads to the total rate of the outer code $R_{out}$=0.437.\

B. Results

Figure 4:
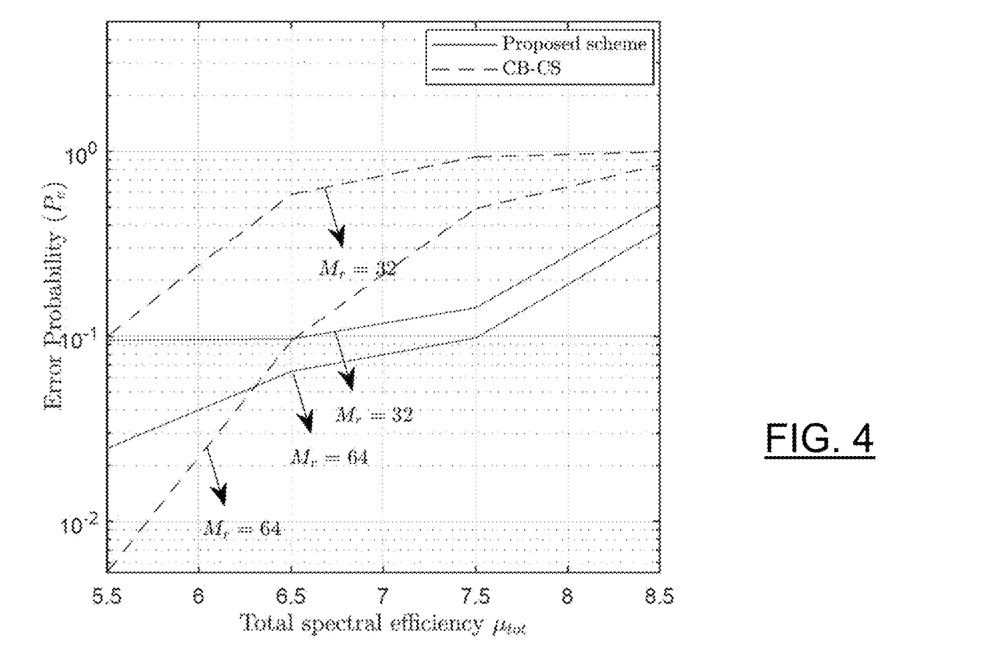
FIG. 4 shows performance of the proposed scheme as a function of the total spectral efficiency, $\mu_{tot}$, and receive antenna elements, $M_r$, with a fixed number of active users $K_a=150$ and transmit power $P_t=15$ dBm.
Figure 5:
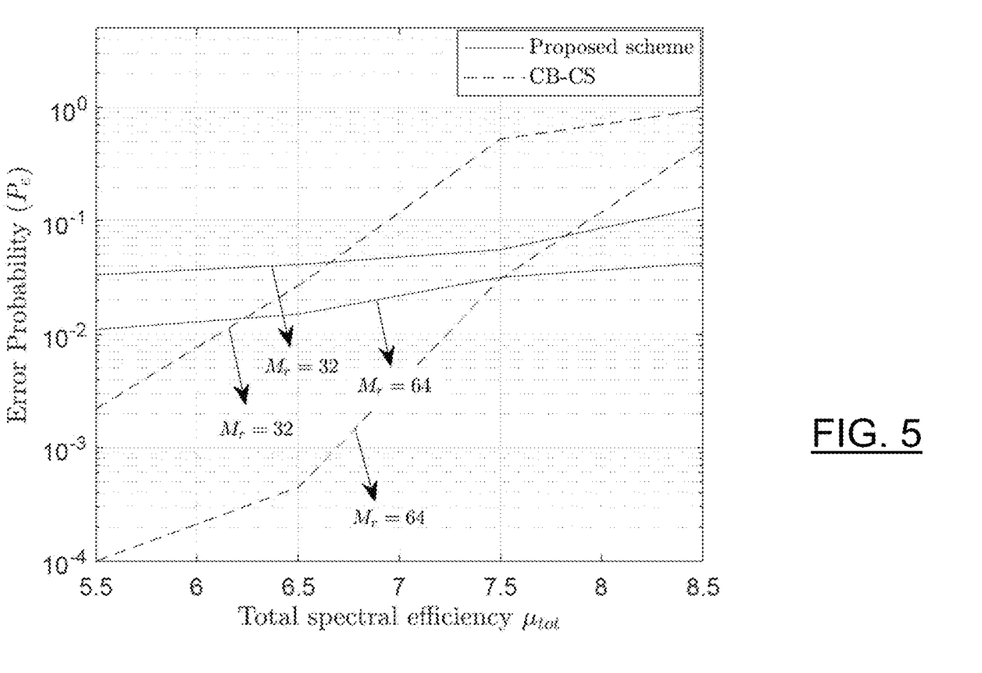
FIG. 5 shows performance of the proposed scheme as a function of the total spectral efficiency, $\mu_{tot}$, and receive antenna elements, $M_r$, with a fixed number of active users $K_a=150$ and transmit power $P_t=20$ dBm.

FIGS. 4 and 5 depict the performance of both URA schemes as a function of the total spectral efficiency $\mu_{tot}=K_aB/n$. In FIG. 4, we fix the transmit power to $P_t$=15 dBm for all the users and show two curves for two different number of antennas, namely $M_r$=32 and $M_r$=64. Similar setting is depicted in FIG. 5 except the transmit power is increased to $P_t$=20 dBm. The total number of users in both plots is fixed to $K_a$=150. From the total spectral efficiency it is possible to calculate the blocklength required for both CB-CS and the proposed URA scheme using $n=(BK_a)/\mu_{tot}$ and the blocklength per slot $n_0$=n/L. At the smallest spectral efficiency considered in FIGS. 4 and 5 (i.e., $\mu_{tot}$=5.5 bits/channel-use), the blocklength per-slot of the proposed scheme becomes $n_0$=464. This yields a sensing matrix A which has $N_{row}=(2M_r) \times 464$ rows and $N_{col}=(2M_r) \times 2^{17}$ columns. As a matter of fact, when $M_r$=64 we have $N_{row} \sim 10^4$ and $N_{cot} \sim 10^7$ which is a very large dimension for the multiple matrix-vector multiplications required inside HyG-AMP. To alleviate this computational burden, we use a circulant Gaussian codebook $\tilde{A}$ so as to perform these multiplications via the fast Fourier transform (FFT) algorithm. Huge computational savings also follow from taking advantage of the inherent Kronecker structure in A involved in (9).

As can be seen from FIGS. 4 and 5, the proposed scheme outperforms CB-CS when the total spectral efficiency becomes large as is desirable in massive connectivity setups. The inefficiency of CB-CS stems from the fact that at high total spectral efficiency the number of active users exceeds both the number of antenna branches at the BS and the per-slot blocklength. The proposed URA scheme is able to support high spectral efficiencies by making use of the small-scale fading signatures of the different users to stitch sequences instead of relying on concatenated coding which reduces the effective data rate. In fact, as the number of antennas increases, the users' channels become almost orthogonal and users can be easily separated in the spatial domain due to the higher spatial resolution and the channel hardening effect, which is one of the blessings of massive MIMO.

It is worth mentioning, however, that by eliminating the outer code one expects a net gain of $1/R_{outer}$ in spectral efficiency under perfect CSI. In this respect, we emphasize the fact that at $P_t=20$ dBm and small spectral efficiencies it was found that HyGAMP provides quasi-perfect CSI. Therefore, the error floor observed at the low-end spectral efficiency in FIGS. 4 and 5 is due to the inefficiencies of EM-based clustering. Using the Bayes optimal clustering decoder [31] instead of EM is hence an interesting research topic which we plan to investigate in the near future.

Figure 6:
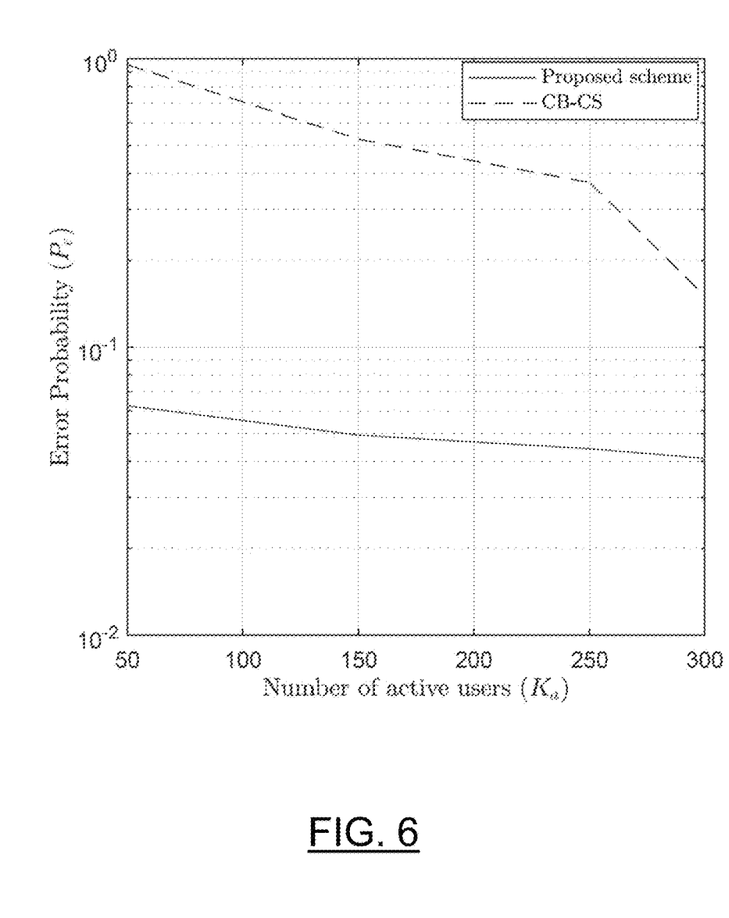
FIG. 6 shows performance of the proposed scheme as a function of the number of active users, $K_a$, with fixed total spectral efficiency, $\mu_{tot}=7.5$ bits/channel-use, number of receive antennas, $M_r=32$, and transmit power $P=20$ dBm.

Now, we turn the tables and fix the total spectral efficiency to $\mu_{tot}=7.5$ bits/channel-use while varying the number of active users from $K_a=50$ to $K_a=300$. The performance of both URA schemes is depicted in FIG. 6. There, the number of receive antennas and the transmit power were fixed to $M_r=32$ and $P_t=20$ dBm, respectively. At such high total spectral efficiency, the proposed scheme achieves a decoding error probability $P_e \sim 10^{-2}$ by using 32 antennas only. The net performance gains brought by the proposed scheme are of course a direct consequence of removing the concatenated coding thereby providing the HyGAMP CS decoder with more observations to reconstruct the channels as opposed to the inner CS decoder of the CB-CS scheme.

Figure 7:
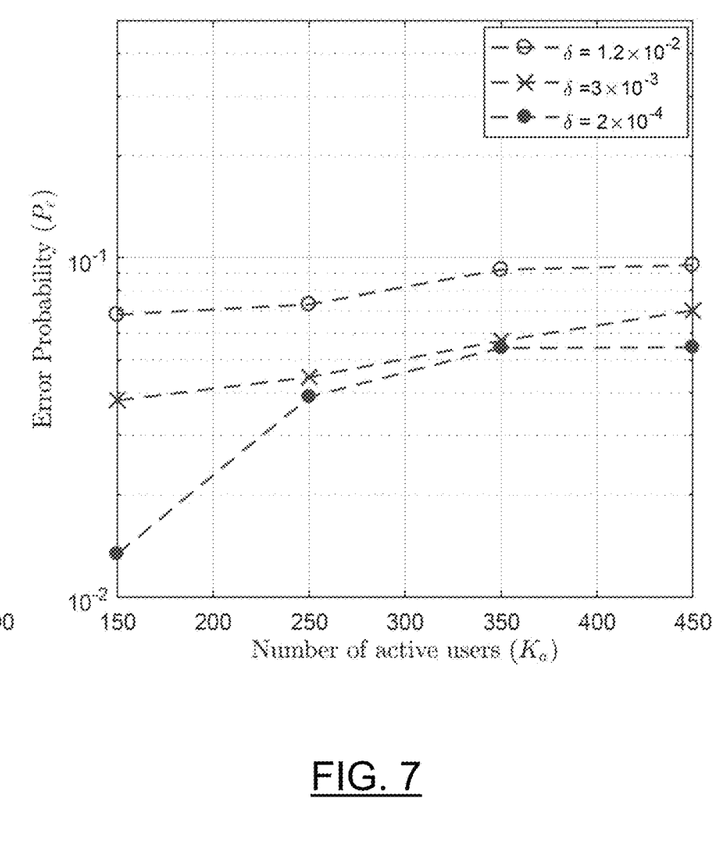
FIG. 7 shows performance of the proposed scheme under inter-slot channel time variations as a function of the number of active users, $K_a$, with fixed per-user spectral efficiency, $\mu=0.015$ bits/channel-use/user, number of receive antennas, $M_r=32$, and transmit power $P_t=15$ dBm.

In FIG. 7, we assess the performance of the proposed scheme as a function of the number of active users, $K_a$, with channel time variations across slots (i.e., with slot-wise block-fading only). The decorrelation of the channel between two consecutive slots is denoted by $\delta$. Consider a rich scattering environment in which the channel correlation, at discrete time lag k, follows the Clarke-Jakes' model:

$$R_h[k] = J_0\left(2\pi f_c \frac{kv}{W_c}\right) = \sqrt{(1-\delta)}, \quad (67)$$

wherein $J_0(\cdot)$ is the zero-order Bessel function of the first kind, $f_c=2$ GHz is the carrier frequency, v is the relative velocity between the receiver and the transmitter, and $c=3\times 10^8$ m/s is the speed of light. In FIG. 7 we investigate three different mobility regimes at per-user spectral efficiency $\mu=0.015$ bits/user/channel-use. This corresponds to $k=1133$ which can be used in (67) to find the value of $\delta$ associated to each relative velocity v as follows:

1. Typical pedestrian scenario (v=5 km/h) for which $\delta=0.00002$,
2. Typical urban scenario (v=60 km/h) for which $\delta=0.00312$,
3. Typical vehicular scenario (v=120 km/h) for which $\delta=0.01244$.

The simulation results shown in FIG. 7 reveal that the performance of the proposed algorithm is still acceptable even under the high-speed scenario (i.e., up to v=120 km/h). This is because the EM algorithm is able to capture the inter-slot/intra-cluster time correlations through the updated covariance matrices.

CONCLUSION

There is disclosed a new algorithmic solution to the unsourced random access problem that is also based on slotted transmissions. As opposed to all existing works, however, the proposed scheme relies purely on the rich spatial dimensionality offered by large-scale antenna arrays instead of coding-based coupling for sequence stitching purposes. HyGAMP CS recovery algorithm has been used to reconstruct the users channels and decode the sequences on a per-slot basis. Afterwards, the EM framework together with the Hungarian algorithm have been used to solve the underlying constrained clustering/stitching problem. The performance of the proposed approach has been compared to the only existing URA algorithm, in the open literature. The proposed scheme provides performance enhancements in a high spectral efficiency regime. There are many possible avenues for future work. The two-step procedure of channel estimation and data decoding is overall sub-optimal. Therefore, it is desirable to devise a scheme capable of jointly estimating the random permutation and the support of the unknown block-sparse vector in each slot. In addition, it will be interesting to improve the proposed scheme by exploiting the fact that the same set of channels are being estimated across different slots. We also believe that making further use of the large-scale fading coefficients can be a fruitful direction for future research.

As described hereinbefore, the present invention relates to a new algorithmic solution to the massive unsourced random access (URA) problem, by leveraging the rich spatial dimensionality offered by large-scale antenna arrays. This disclosure makes an observation that spatial signature is key to URA in massive connectivity setups. The proposed scheme relies on a slotted transmission framework but eliminates concatenated coding introduced in the context of the coupled compressive sensing (CCS) paradigm. Indeed, all existing works on CCS-based URA rely on an inner/outer tree-based encoder/decoder to stitch the slot-wise recovered sequences. This disclosure takes a different path by harnessing the nature-provided correlations between the slot-wise reconstructed channels of each user in order to put together its decoded sequences. The required slot-wise channel estimates and decoded sequences are first obtained through the hybrid generalized approximate message passing (HyG-AMP) algorithm which systematically accommodates the multiantenna-induced group sparsity. Then, a channel correlation-aware clustering framework based on the expectation-maximization (EM) concept is used together with the Hungarian algorithm to find the slot-wise optimal assignment matrices by enforcing two clustering constraints that are very specific to the problem at hand. Stitching is then accomplished by associating the decoded sequences to their respective users according to the ensuing assignment matrices. Exhaustive computer simulations reveal that the proposed scheme can bring performance improvements, at high spectral efficiencies, as compared to a state-of-the-art technique that investigates the use of large-scale antenna arrays in the context of massive URA.

The scope of the claims should not be limited by the preferred embodiments set forth in the examples but should be given the broadest interpretation consistent with the specification as a whole.

REFERENCES

[1] E. Dutkiewicz, X. Costa-Perez, I. Z. Kovacs, and M. Mueck, "Massive machine-type communications," IEEE Network, vol. 31, no. 6, pp. 6-7, 2017.
[2] L. Liu, E. G. Larsson, W. Yu, P. Popovski, C. Stefanovic, and E. De Carvalho, "Sparse signal processing for grant-free massive connectivity: A future paradigm for random access protocols in the internet of things," IEEE Signal Processing Magazine, vol. 35, no. 5, pp. 88-99, 2018.
[3] D. L. Donoho, A. Maleki, and A. Montanari, "Message-passing algorithms for compressed sensing," Proceedings of the National Academy of Sciences, vol. 106, no. 45, pp. 18 914-18 919, 2009.
[4] M. Bayati and A. Montanari, "The dynamics of message passing on dense graphs, with applications to compressed sensing," IEEE Transactions on Information Theory, vol. 57, no. 2, pp. 764-785, 2011.14
[5] L. G. Roberts, "Aloha packet system with and without slots and capture," ACM SIGCOMM Computer Communication Review, vol. 5, no. 2, pp. 28-42, 1975.
[6] E. Paolini, C. Stefanovic, G. Liva, and P. Popovski, "Coded random access: Applying codes on graphs to design random access protocols," IEEE Communications Magazine, vol. 53, no. 6, pp. 144-150, 2015.
[7] Y. Polyanskiy, "A perspective on massive random-access," pp. 2523-2527, 2017.
[8] V. K. Amalladinne, A. Vem, D. K. Soma, K. R. Narayanan, and J.-F. Chamberland, "A coupled compressive sensing scheme for uncoordinated multiple access," arXiv preprint arXiv:1806.00138v1, 2018.
[9] A. Fengler, P. Jung, and G. Caire, "SPARCs for unsourced random access," arXiv preprint arXiv: 1901.06234, 2019.
[10] A. Joseph and A. R. Barron, "Least squares superposition codes of moderate dictionary size are reliable at rates up to capacity," IEEE Transactions on Information Theory, vol. 58, no. 5, pp. 2541-2557, 2012.
[11] R. Calderbank and A. Thompson, "CHIRRUP: a practical algorithm for unsourced multiple access," arXiv preprint arXiv:1811.00879, 2018.
[12] A. K. Pradhan, V. K. Amalladinne, K. R. Narayanan, and J.-F. Chamberland, "Polar coding and random spreading for unsourced multiple access," arXiv preprint arXiv: 1911.01009, 2019.
[13] V. K. Amalladinne, J.-F. Chamberland, and K. R. Narayanan, "An enhanced decoding algorithm for coded compressed sensing," arXiv preprint arXiv:1910.09704, 2019.
[14] A. Pradhan, V. Amalladinne, A. Vem, K. R. Narayanan, and J.-F. Chamberland, "A joint graph based coding scheme for the unsourced random access gaussian channel," arXiv preprint arXiv:1906.05410, 2019.
[15] A. Fengler, G. Caire, P. Jung, and S. Haghighatshoar, "Massive MIMO unsourced random access," arXiv preprint arXiv:1901.00828, 2019.
[16] S. Haghighatshoar, P. Jung, and G. Caire, "A new scaling law for activity detection in massive mimo systems," arXiv preprint arXiv:1803.02288, 2018.
[17] A. Fengler, S. Haghighatshoar, P. Jung, and G. Caire, "Non-bayesian activity detection, large-scale fading coefficient estimation, and unsourced random access with a massive mimo receiver," arXiv preprint arXiv: 1910.11266, 2019.
[18] J. Ziniel and P. Schniter, "Efficient high-dimensional inference in the multiple measurement vector problem," IEEE Transactions on Signal Processing, vol. 61, no. 2, pp. 340-354, 2012.
[19] D. Needell and J. A. Tropp, "Cosamp: Iterative signal recovery from incomplete and inaccurate samples," Applied and computational harmonic analysis, vol. 26, no. 3, pp. 301-321, 2009.
[20] J. Friedman, T. Hastie, and R. Tibshirani, "A note on the group lasso and a sparse group lasso," arXiv preprint arXiv:1001.0736, 2010.
[21] M. J. Wainwright, High-dimensional statistics: A nonasymptotic viewpoint. Cambridge University Press, 2019, vol. 48.
[22] S. Rangan, A. K. Fletcher, V. K. Goyal, and P. Schniter, "Hybrid generalized approximate message passing with applications to structured sparsity," in 2012 IEEE International Symposium on Information Theory Proceedings. IEEE, 2012, pp. 1236-1240.
[23] A. P. Dempster, N. M. Laird, and D. B. Rubin, "Maximum likelihood from incomplete data via the em algorithm," Journal of the Royal Statistical Society: Series B (Methodological), vol. 39, no. 1, pp. 1-22,1977.
[24] S. Rangan, "Generalized approximate message passing for estimation with random linear mixing," in Proc. IEEE Int. Symp. Inf. Theory (ISIT), St. Petersburg, Russia, July 2011, pp. 2168-2172.
[25] A. M. Tulino, G. Caire, S. Verdu, and S. Shamai, "Support recovery with sparsely sampled free random matrices," IEEE Transactions on Information Theory, vol. 59, no. 7, pp. 4243-4271,2013.
[26] A. Abbara, A. Baker, F. Krzakala, and L. Zdeborov'a, "On the universality of noiseless linear estimation with respect to the measurement matrix," Journal of Physics A: Mathematical and Theoretical, vol. 53, no. 16, p. 164001, 2020.
[27] J. P. Vila and P. Schniter, "Expectation-maximization Gaussian-mixture approximate message passing," IEEE Trans. Signal Process, vol. 61, no. 19, pp. 4658-4672, October 2013.
[28] F. Bellili, F. Sohrabi, and W. Yu, "Generalized approximate message passing for massive MIMO mmWave channel estimation with Laplacian prior," IEEE Transactions on Communications, vol. 67, no. 5, pp. 3205-3219,2019.
[29] L. Liu and W. Yu, "Massive connectivity with massive mimopart i: Device activity detection and channel estimation," IEEE Transactions on Signal Processing, vol. 66, no. 11, pp. 2933-2946,2018.
[30] C. M. Bishop, Pattern recognition and machine learning. springer, 2006.
[31] T. Lesieur, C. De Bacco, J. Banks, F. Krzakala, C. Moore, and L. Zdeborova, "Phase transitions and optimal algorithms in high-dimensional gaussian mixture clustering," in 2016 54th Annual Allerton Conference on Communication, Control, and Computing (Allerton). IEEE, 2016, pp. 601-608.

The invention claimed is:

1. A method for receiving, at a communications station which has a plurality of antennas, messages from a plurality of users in wireless communication with the communications station, the method comprising:

receiving, from the users, using the plurality of antennas, time-slotted information chunks formed from the messages of the users, wherein the information chunks are free of any encoded user-identifiers representative of the users transmitting the messages;

after receiving all of the information chunks, estimating vectors representative of respective communication channels between the antennas and the users based on the received information chunks;

grouping the information chunks based on the estimated vectors to form clusters of the information chunks respectively associated with the users; and     recovering the messages of the users from the clusters of the information chunks.

2. The method of claim 1 wherein grouping the information chunks based on the estimated vectors is performed using a Gaussian-mixture expectation-maximization algorithm.

3. The method of claim 1 wherein, when the information chunks are encoded by compressed sensing to reduce a size thereof, the method further includes decoding the information chunks using a hybrid generalized approximate message passing algorithm.

4. The method of claim 1 further including normalizing the vectors representative of respective communication channels before grouping the information chunks based on the estimated vectors.

5. The method of claim 4 wherein normalizing is performed using large-scale fading coefficients estimated using a compressed sensing recovery algorithm.

6. The method of claim 5 wherein the compressed sensing recovery algorithm is a hybrid generalized approximate message passing algorithm.

7. The method of claim 1 wherein estimating vectors representative of respective communication channels comprises applying, to the received information chunks, expectation-maximization and the Hungarian algorithm to determine slot-wise assignment matrices which satisfy constraints including (i) one information chunk per user per slot, and (ii) a common number of the information chunks for each user.

8. The method of claim 7 wherein grouping the information chunks based on the estimated vectors is based on the assignment matrices.

* * * * *